United States Patent
Lönn (10) Patent No.: US 9,241,056 B2
(45) Date of Patent: Jan. 19, 2016

(54) IMAGE BASED DIALING

(75) Inventor: Fredrik Alexander Lönn, Södra Sandby (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 1544 days.

(21) Appl. No.: 11/425,744

(22) Filed: Jun. 22, 2006

(65) Prior Publication Data

US 2007/0296739 A1    Dec. 27, 2007

(51) Int. Cl.
*H04L 12/58*    (2006.01)
*H04M 1/2745*    (2006.01)
(Continued)

(52) U.S. Cl.
CPC ...... *H04M 1/27455* (2013.01); *H04M 1/72555* (2013.01); *H04N 1/32048* (2013.01); *H04N 1/32128* (2013.01); *H04N 21/41407* (2013.01); *H04N 21/4223* (2013.01); *H04N 21/440236* (2013.01); *H04N 21/8153* (2013.01); *H04L 51/08* (2013.01); *H04L 51/10* (2013.01); *H04L 51/18* (2013.01); *H04L 51/38* (2013.01); *H04M 1/274508* (2013.01); *H04N 1/00307* (2013.01); *H04N 2201/0084* (2013.01); *H04N 2201/3205* (2013.01); *H04N 2201/3207* (2013.01); *H04N 2201/3208* (2013.01); *H04N 2201/3209* (2013.01); *H04N 2201/3214* (2013.01); *H04N 2201/3215* (2013.01); *H04N 2201/3226* (2013.01); *H04N 2201/3252* (2013.01); *H04N 2201/3273* (2013.01); *H04N 2201/3277* (2013.01)

(58) Field of Classification Search
CPC ......... H04L 51/08; H04L 51/10; H04L 51/18; H04L 51/38
See application file for complete search history.

(56) References Cited

U.S. PATENT DOCUMENTS 7,196,718 B1 * 3/2007 Barbeau et al. ............ 348/14.02
7,353,046 B2 * 4/2008 Morita et al. ................ 455/566
(Continued)

FOREIGN PATENT DOCUMENTS

CN    1259004 A    7/2000
CN    1705325 A    12/2005
(Continued)

OTHER PUBLICATIONS

International Search Report and Written Opinion for PCT/IB2006/055030, mailed Jul. 13, 2007, (14 pages).
(Continued)

*Primary Examiner* — Jae Y Lee
*Assistant Examiner* — Aixa A Guadalupe-Cruz
(74) *Attorney, Agent, or Firm* — James C. Edwards; Moore & Van Allen PLLC (57) ABSTRACT

A device may include an image display component to display an image that includes a subject, where the image has a header portion, and to display subject information that includes a communication identifier related to the subject, and wherein the subject information is stored in the header portion. The device may include a transceiver to contact the subject via the communication identifier. The device may include a processor to provide the image and the subject information to the display component, to receive a request to contact the subject, to retrieve the communication identifier from the header portion, and to send the communication identifier to the transceiver to cause the transceiver to contact the subject.

14 Claims, 7 Drawing Sheets

(51) Int. Cl.
*H04M 1/725* (2006.01)
*H04N 1/32* (2006.01)
*H04N 21/414* (2011.01)
*H04N 21/4223* (2011.01)
*H04N 21/4402* (2011.01)
*H04N 21/81* (2011.01)
*H04N 1/00* (2006.01)

(56) References Cited

U.S. PATENT DOCUMENTS

| | | | |
|---|---|---|---|
| 7,375,730 B2 * | 5/2008 | Tagliabue et al. | 345/581 |
| 7,627,311 B2 * | 12/2009 | Oijer | 455/415 |
| 7,680,513 B2 * | 3/2010 | Haitani et al. | 455/556.2 |
| 2003/0058353 A1 * | 3/2003 | Tsue | 348/231.2 |
| 2003/0149731 A1 * | 8/2003 | Ohwa | 709/206 |
| 2005/0233697 A1 | 10/2005 | Yu | |
| 2006/0061810 A1 * | 3/2006 | Choi et al. | 358/1.15 |
| 2007/0086773 A1 * | 4/2007 | Ramsten et al. | 396/287 |

FOREIGN PATENT DOCUMENTS

| | | |
|---|---|---|
| EP | 0 858 202 A2 | 8/1998 |
| EP | 0 930 770 A2 | 7/1999 |
| EP | 1 033 878 A2 | 9/2000 |
| EP | 1033878 A2 * | 9/2000 |
| EP | 1 298 912 A2 | 4/2003 |
| GB | 2 346 769 A | 8/2000 |
| JP | 2000-209324 A | 7/2000 |
| JP | 2001-197567 A | 7/2001 |
| JP | 2001-333211 A | 11/2001 |
| JP | 2002-232555 A | 8/2002 |
| JP | 2003-110975 A | 4/2003 |
| JP | 2003143287 A | 5/2003 |
| JP | 2006-093863 A | 4/2006 |
| KR | 2000-0047524 A | 7/2000 |
| KR | 2006-0027475 A | 3/2006 |
| RU | 2 271 615 C2 | 3/2006 |
| TW | 200501706 A | 1/2005 |
| WO | WO 01/30053 A1 | 4/2001 |
| WO | WO 01/47210 A2 | 6/2001 |
| WO | WO 2005/081507 A1 | 9/2005 |

OTHER PUBLICATIONS

International Preliminary Report on Patentability issued in international application No. PCT/IB2006/055030, mailed Sep. 29, 2008, 8 pages.
Korean Intellectual Property Office; Notice of Third Preliminary Rejection; Mar. 9, 2012; issued in Korean Patent Application No. 2009-7001158.
Chinese Intellectual Property Office; Second Official Action; Apr. 6, 2012; issued in Mexican Patent Application No. 200680055654.8.
Korean Intellectual Property Office; Notice of Second Preliminary Rejection; Jun. 27, 2011; issued in Korean Patent Application No. 2009-7001158.
Mexican Patent Office; Official Action; Jun. 27, 2011; issued in Mexican Patent Application No. MX/a/2008/016095.
Japanese Patent Office; Final Office Action; May 27, 2011; Japanese Patent Application No. 2009-515973.
Mexican Intellectual Property Office; Office Action; Jun. 14, 2011, issued in Mexican Patent Application No. MX/a/2008/016095.
State Intellectual Property Office, P.R. China; Third Official Action; Nov. 26, 2012; issued in Chinese Patent Application No. 200680055654.8.
Chinese State Intellectual Property Office; First Office Action; May 18, 2011; issued in Chinese Patent Application No. 200680055654.8.
Taiwan Intellectual Property Office; Office Action; Mar. 21, 2014; issued in Taiwan Patent Application No. 096103371.
Indian Patent Office; First Examination Report; Jan. 29, 2015; issued in Indian Patent Application No. 10350/DELNP/2008.

* cited by examiner

IMAGE BASED DIALING

BACKGROUND OF THE INVENTION

1. Technical Field of the Invention

Implementations described herein relate generally to wireless devices, and more particularly to performing operations related to images displayed on wireless devices.

2. Description of Related Art

Devices, such as mobile communication devices, may perform functions other than communication functions to make these devices more useful to consumers. For example, mobile communication devices may be configured to store and play music and/or video files, and/or to record still images or video.

A consumer may find mobile communication devices with image capturing capabilities to be very useful as the consumer does not have to carry a separate camera to record images. Users may find that they take pictures with their mobile communication devices at a number of locations due to the portability of the mobile communication devices.

At times, users may not remember the names of people in photographs taken with a mobile communication device. For example, a user may want to call a person in a photograph that was taken using the mobile communication device. The user may not be able to remember the name of the person in the photograph even when the person's name is in a phonebook on the mobile communication device. The user may have difficulty remembering the person's name because the user is unable to associate the person's appearance with that person's name.

BRIEF SUMMARY OF THE INVENTION

According to one aspect, a device is provided. The device may comprise an image display component to display an image that includes a subject, where the image is related to an image file having a header portion, and to display subject information that includes a communication identifier related to the subject, and wherein the subject information is stored in the header portion. The device may comprise a transceiver to contact the subject via the communication identifier. The device may comprise a processor to provide the image and the subject information to the display component, to receive a request to contact the subject, to retrieve the communication identifier from the header portion, and to send the communication identifier to the transceiver to cause the transceiver to contact the subject.

Additionally, the device may include a camera to capture the image in response to a user input.

Additionally, the communication identifier may comprise a name, a telephone number, an email address, an instant messaging address, an Internet protocol address, or a residential address.

Additionally, the header portion may comprise a header, a start frame, a start segment, a marker, or a tag.

Additionally, the transceiver contacts the subject by dialing a phone number, sending an email to an email address, or sending an instant message to an instant messaging address.

Additionally, the processor receives the request in response to a voice prompt, a control key signal, a keypad signal, or a touch-sensitive display signal.

Additionally, the processor receives a selection indicator that selects the subject prior to providing the instruction.

Additionally, the device receives the subject information from a user or another device.

Additionally, the device may comprise storage to store the subject information in the header portion.

Additionally, the transceiver sends the image and the subject information to a destination automatically or based on a request from a remote device.

In accordance with another aspect, a mobile terminal is provided. The mobile terminal may comprise a transceiver to receive an image that includes subject information stored in a header of the image, where the subject information is related to a subject appearing in the image, and where the image is received from a remote device, and to establish a communication session with the subject based on a communication request, where the communication request is generated based on the subject information. The mobile terminal may comprise a display to display the image and the subject information. The mobile terminal may comprise a processor to read the subject information from the header, to provide the subject information and the image to the display, and to generate the communication request in response to a user input, where the user input is produced based on content of the image or the subject information.

Additionally, the mobile terminal may comprise a camera to capture a second image and wherein the processor further relates second subject information to a header of the second image, retrieves the second subject information from the header, and generates a second communication request based on the retrieved second subject information, where the second communication request is used to establish a second communication session with a second subject.

In accordance with yet another aspect, a wireless device is provided. The wireless device may comprise means for maintaining an image catalog comprising a plurality of images; means for displaying one of the plurality of images containing a subject and subject information that is related to the subject; means for receiving the subject information, where the subject information is retrieved from a header portion of the one of the plurality of images, and wherein the subject information further comprises communication information; and means for communicating with the subject using the communication information.

In accordance with yet another aspect, a method is provided. The method may include receiving an image comprising a header, retrieving subject information from the header, where the subject information identifies a subject or contact information for the subject, displaying the image and the subject information via a display on a wireless device, selecting the subject information based on the displaying, and establishing, based on the selecting, a communication session with the subject using the contact information.

Additionally, the receiving further comprises receiving the image from a camera, and wherein the method further comprises receiving the subject information via a remote device, a user input, a local database, a remote database, a local application, or a remote application.

Additionally, the method may comprise sending the image and the subject information to a remote device during the communication session.

In accordance with yet another aspect, a method is provided. The method may comprise capturing an image, creating an image file comprising a data portion and a header portion, storing, automatically, the image in the data portion and subject information in the header portion, where the subject information identifies the user and includes a phone number, email address, or instant messaging address, and sending the image file to a destination via a wireless link to allow a destination device to contact the user via the subject information in response to displaying the image data on the destination device.

In accordance with still another aspect, a method is provided. The method may comprise capturing an image, creating an image file comprising a data portion and a header portion, and retrieving subject information from an application, where the subject information comprises a subject name and subject contact information and is related to a subject in the image. The method may comprise storing the image via the data portion, storing the subject information via the header portion, and establishing a communication session with the subject based on the subject contact information, where the subject contact information is read from the header prior to the establishing.

Additionally, the retrieving further comprises retrieving the subject information from a local application operating on a wireless device or a remote application that sends data to the wireless device via a wireless link.

Additionally, the method further comprises displaying the image and the subject information, producing an instruction in response to a user input, and wherein the establishing is performed in response to the instruction.

BRIEF DESCRIPTION OF THE DRAWINGS

The accompanying drawings, which are incorporated in and constitute a part of this specification, illustrate one or more embodiments of the invention and, together with the description, explain the invention. In the drawings.

DETAILED DESCRIPTION OF THE INVENTION

The following detailed description of the invention refers to the accompanying drawings. The same reference numbers in different drawings may identify the same or similar elements. Also, the following detailed description does not limit the invention.

Implementations described herein can be used to perform operations related to images. For example, a mobile terminal may be equipped with a digital camera. A user may take a digital picture (image) using the camera and may wish to associate information with the image, such as information about a person appearing in the image, information about the content of the image, information about a person taking a picture, etc.

An implementation may receive information from a user and may relate the information to the image. For example, the mobile terminal may receive information from the user that identifies a person (subject) in the image, such as a name, phone number, email address, residential address, etc. The mobile terminal may associate the entered information with the image so that the user can communicate with the person in the image. The image may include a data portion and a header portion. The mobile terminal may store the information (e.g., phone number) in the header portion. The mobile terminal may retrieve the information from the header portion and may display the retrieved information with the data. The user may view an image on a display device used in the mobile terminal and the displayed image may include the names and/or phone numbers of persons in the image. The user may select a phone number related to one of the persons in the image via a selection device (e.g., a cursor) and may dial that person's phone number via a keypad entry, control key entry, touch-sensitive display entry, and/or voice prompt.

An implementation may automatically associate information with an image and may send the associated information to a destination when the image is sent to a destination. For example, a user's mobile terminal may automatically associate the user's name, address, and/or phone number with images captured by the user via a camera in the mobile terminal. The user's name, address and/or phone number may be sent to a destination along with the image.

Another implementation may maintain a catalog of images on the mobile terminal. A user may be able to scroll through the images and may be able to view information about persons in the images when the images are viewed using the mobile terminal. For example, the user may view an image of two people and the names, addresses, and/or phone numbers for the two people may be superimposed over a lower portion of the displayed image. The user may depress a first key to call the first person appearing in the image and may depress a second key to call the second person appearing in the image. The user may be able to place the call(s) without having to access another application, such as a phonebook application, on the mobile terminal, and/or without having to manually dial the phone number(s).

In still another implementation, the user may capture an image with the mobile terminal and may label the image. For example, the user may capture an image and may label the image "Bill." The mobile terminal may access an application (e.g., a contact information database) and may retrieve contact information for one or more persons named Bill. For example, the mobile terminal may display Bill Smith, Bill Jones, and Bill Hill. The user may select the name of the person appearing in the image (e.g., Bill Jones). The mobile terminal may automatically copy information related to the selected name (Bill Jones) into a header portion of the image that includes pictures of Bill Jones.

Implementations may allow the user to identify subjects in images and to call those subjects without retrieving phone numbers and/or names of the persons in the image from another application, such as a phonebook application operating on the mobile terminal.

As used herein, "subject information" refers to information related to a subject associated with an image displayed via a display device and/or stored in a memory. Examples of subjects that may be associated with an image and that may have subject information related thereto may include people, animals, landmarks, objects, etc. Examples of subject information may include telephone numbers, email addresses, instant messaging (IM) addresses, Internet protocol (IP) addresses, residential/commercial addresses, etc.

Exemplary implementations will be described in the context of a mobile communication terminal. It should be understood that a mobile communication terminal is an example of one type of device that can employ image-based dialing techniques as described herein and should not be construed as limiting the types of devices or applications that can use these image-based dialing techniques. For example, image-based dialing techniques described herein, may be used in other devices, such as film-based cameras and/or digital cameras that can be connected to a communication device or network via a cable or other type of interconnect, and/or other types of communication devices that can include camera-like functions and communication functions.

Exemplary Mobile Terminal

Figure 1A:
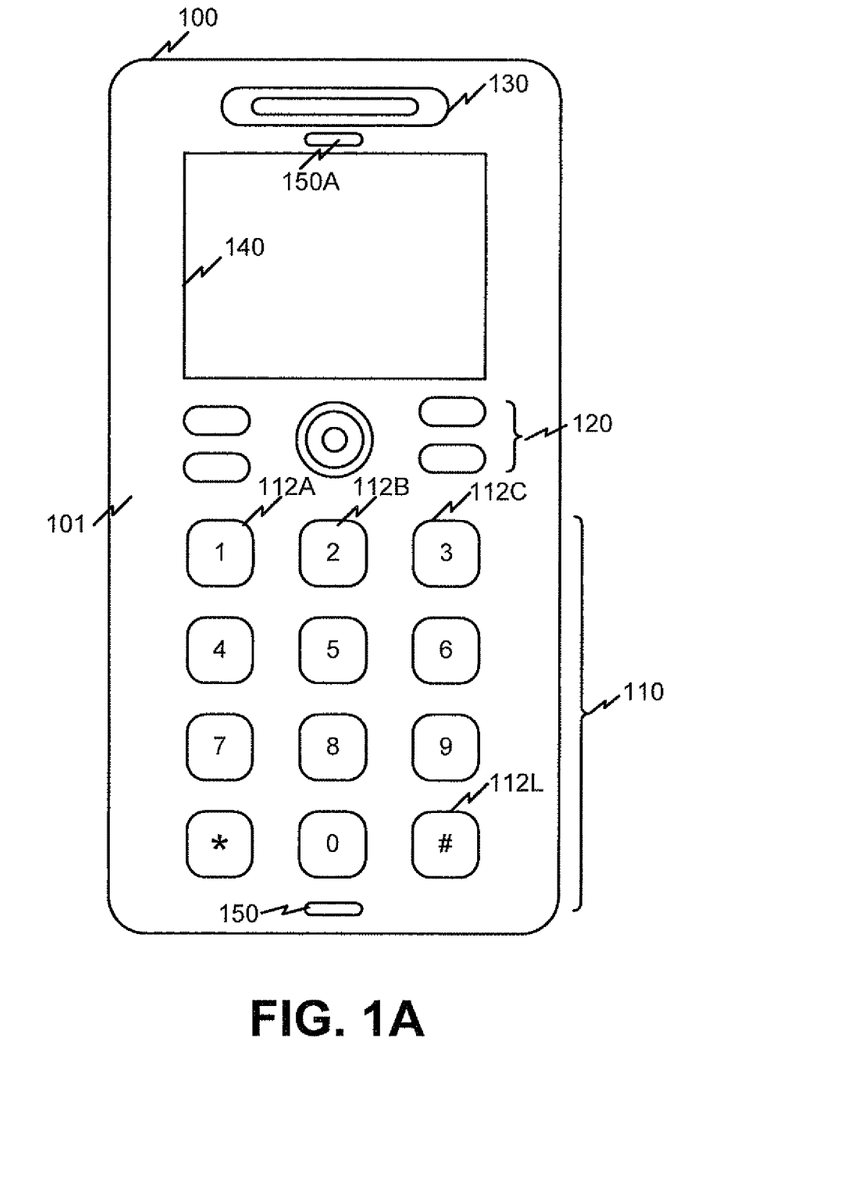
FIGS. 1A and 1B are diagrams of an exemplary implementation of a mobile terminal.

FIG. 1A is a diagram of an exemplary implementation of a mobile terminal 100. Mobile terminal 100 (hereinafter terminal 100) may be a mobile communication device. As used herein, a "mobile communication device" and/or "mobile terminal" may include a radiotelephone; a personal communications system (PCS) terminal that may combine a cellular radiotelephone with data processing, a facsimile, and/or data communications capabilities; a PDA that can include a radiotelephone, pager, Internet/intranet access, web browser, organizer, calendar, and/or global positioning system (GPS) receiver; and a laptop and/or palmtop receiver or other appliance that can include a radiotelephone transceiver.

Terminal 100 may include housing 101, keypad 110, control keys 120, speaker 130, display 140, and microphones 150 and 150A. Housing 101 may include a structure configured to hold devices and components used in terminal 100. For example, housing 101 may be formed from plastic, metal, or another material and may be configured to support keys 112A-L (collectively keys 112), control keys 120, speaker 130, display 140 and microphone 150 or 150A. In one implementation, housing 101 may form a front surface, or face of terminal 100.

Keypad 110 may include input devices, such as keys 112A-L, that can be used to enter information into terminal 100. Keys 112 may be used in a keypad (as shown in FIG. 1A), in a keyboard, or in some other arrangement of keys. Implementations of keys 112 may have key information associated therewith, such as numbers, letters, symbols, etc. A user may interact with keys 112 to input key information into terminal 100. For example, a user may operate keys 112 to enter digits, commands, and/or text into terminal 100.

Control keys 120 may include buttons that permit a user to interact with terminal 100 to cause terminal 100 to perform an action, such as to take a digital photograph using a digital camera embedded in terminal 100, display a text message via display 140, raise or lower a volume setting for speaker 130, establish a communication session, etc. Speaker 130 may include a device that provides audible information to a user of terminal 100. Speaker 130 may be located in an upper portion of terminal 100 and may function as an ear piece or with an ear piece when a user is engaged in a communication session using terminal 100.

Display 140 may include a device that provides visual information to a user. For example, display 140 may provide information regarding incoming or outgoing calls, text messages, games, images, video, phone books, the current date/time, volume settings, etc., to a user of terminal 100. Display 140 may include touch-sensitive elements to allow display 140 to receive inputs from a user of terminal 100. Implementations of display 140 may display still images or video. Implementations of display 140 may further display information about devices sending information to terminal 100, such as base stations and/or other types of transmitters. Microphones 150 and/or 150A may, respectively, include a device that converts speech or other acoustic signals into electrical signals for use by terminal 100.

Figure 1B:
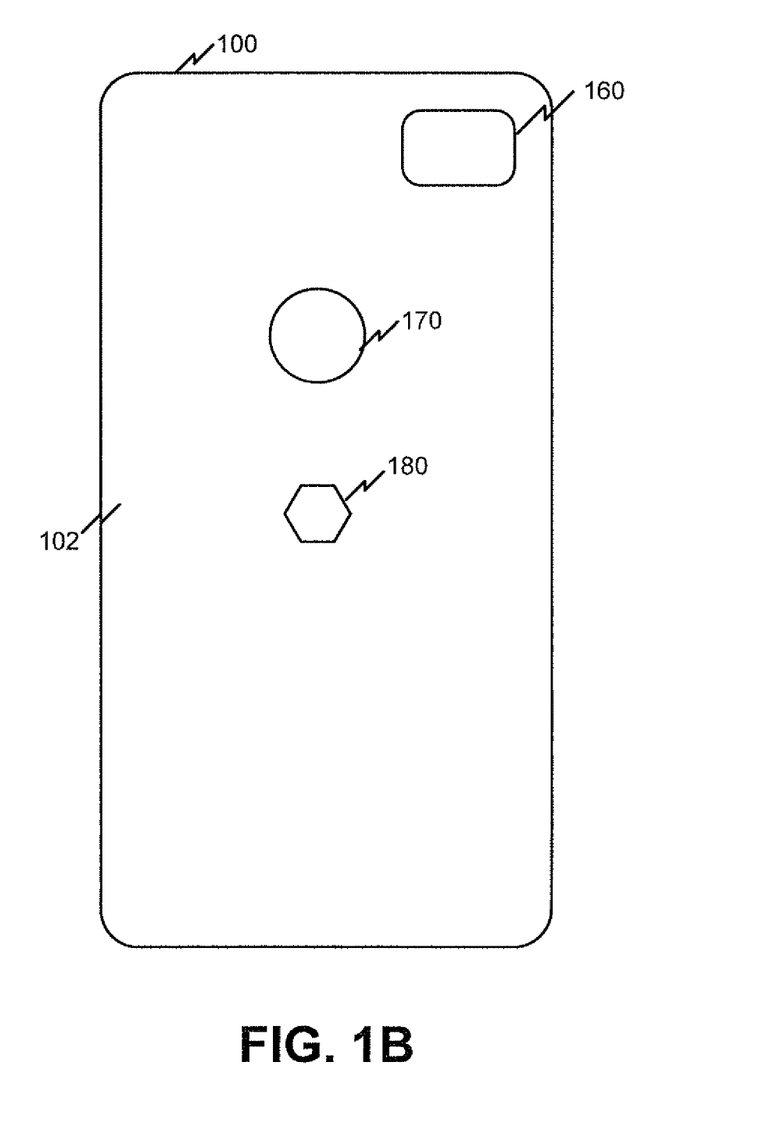

FIG. 1B illustrates a back surface 102 of terminal 100. Back surface 102 may include a flash 160, a lens 170, and a range finder 180. Back surface 102 may be made of plastic, metal, and/or another material and may be configured to support flash 160, lens 170, and range finder 180.

Flash 160 may include a device to illuminate a subject that is being photographed with lens 170. Flash 160 may include an incandescent light source, a light emitting diode (LED) based light source, a xenon based light source and/or other types of illumination devices. Lens 170 may include a device to receive optical information related to an image. For example, lens 170 may receive optical reflections from a subject and may capture a digital representation of the subject using the reflections. Lens 170 may include optical elements, mechanical elements, and/or electrical elements that operate as part of a digital camera implemented in terminal 100.

Range finder 180 may include a device to determine a range from lens 170 to a subject (e.g., a subject being photographed using terminal 100). Range finder 180 may operate by determining image sharpness in cooperation with a feedback loop. For example, an error associated with the sharpness of an image captured via lens 170 may be used as feedback to allow camera 250 to focus on the image. Another implementation of range finder 180 may be connected to an auto-focus element associated with lens 170 to bring a subject into focus with respect to image capturing devices operating with lens 170. Range finder 180 may operate using ultrasonic signals, infrared signals, etc. For example, an implementation of range finder 180 may use an LED to illuminate a subject to allow for feedback based auto focusing in dimly lit environments.

Exemplary Functional Diagram

Figure 2:
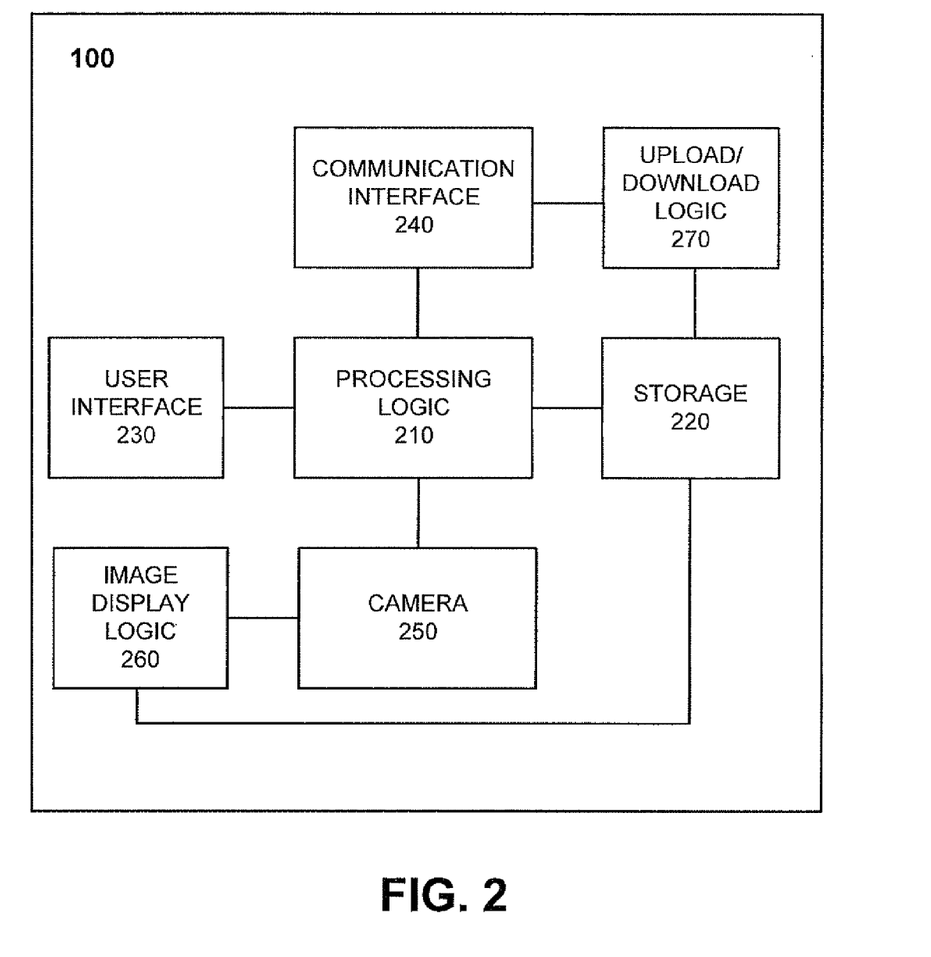
FIG. 2 illustrates an exemplary functional diagram of a mobile terminal.

FIG. 2 illustrates an exemplary functional diagram of terminal 100. As shown in FIG. 2, terminal 100 may include processing logic 210, storage 220, a user interface 230, a communication interface 240, a camera 250, image display logic 260, and upload/download logic 270. Processing logic 210 may include a processor, microprocessor, an application specific integrated circuit (ASIC), field programmable gate array (FPGA), or the like. Processing logic 210 may include data structures or software programs to control operation of terminal 100 and its components, such as camera 250. Storage 220 may include a random access memory (RAM), a read only memory (ROM), a magnetic or optical disk and its corresponding drive and/or another type of memory to store data and instructions that may be used by processing logic 210.

An implementation of processing logic 210 may insert information into a portion of an image or image file, such as a header portion, and/or may link subject information to the header portion. In another implementation, processing logic 210 may automatically relate subject information to a portion of an image (e.g., a header portion) when camera 250 captures an image so that the image and/or subject information can be sent to a destination device using communication interface 240 and/or upload/download logic 270. In still another implementation, processing logic 210 may control a catalog of images in cooperation with storage 220 and/or image display logic 260. For example, processing logic 210 may allow a user to scroll through images in the catalog and may further let the user dial a phone number related to a subject in the image via a single action, e.g., a user input. In yet another implementation, processing logic 210 may retrieve subject information, e.g., a name, phone number, etc., from another application (e.g., an address book application) and may label a displayed image with the retrieved information. Processing logic 210 may further insert the retrieved information into a header portion of the image so that the subject information can be stored with the image.

User interface 230 may include mechanisms for inputting information to terminal 100 and/or for outputting information from terminal 100. Examples of input and output mechanisms might include a speaker (e.g., speaker 130) to receive electrical signals and output audio signals, a microphone (e.g., microphone 150) to receive audio signals and output electrical signals, buttons (e.g., control keys 120 and/or keys 112) to permit data and control commands to be input into terminal 100, a display (e.g., display 140) to output visual information, and/or a vibrator to cause terminal 100 to vibrate.

Communication interface 240 may include, for example, an antenna, a transmitter that may convert baseband signals from processing logic 210 to radio frequency (RF) signals and/or a receiver that may convert RF signals from the antenna to baseband signals. Alternatively, communication interface 240 may include a transceiver that performs the functions of both a transmitter and a receiver. Communication interface 240 may operate with other components, such as processing logic 210, image display logic 260 and/or upload/download logic 270 when establishing a communication session on behalf of terminal 100.

Camera 250 may include hardware and software based logic to create still or moving images using terminal 100. In one implementation, camera 250 may include solid-state image capturing components, such as charge coupled (CCDs) and/or complementary metal oxide semiconductor (CMOS) devices. In other implementations, camera 250 may include non-solid state devices, such as devices used to record images onto film.

Image display logic 260 may include hardware or software to display an image on terminal 100. Image display logic 260 may include a flat panel display device, such as a liquid crystal display (LCD) based device. Implementations of image display logic 260 may further include touch-sensitive display devices adapted to display information to a user of terminal 100 and/or to receive user inputs. Image display logic 260 may display still images (e.g., photographs), moving images (e.g., video), text, numbers, symbols, etc. to a user of terminal 100.

In an implementation, image display logic 260 may display an image and subject information via display 140. Image display logic 260 may identify structure information related to an image (e.g., header information, start frame information, start marker information, start sequence information, etc.) when loading an image for display. Image display logic 260 may retrieve subject information from one or more fields related to the structure information (e.g., a generic field in a header of an image) and may display the subject information in a portion of the image via display 140.

Image display logic 260 may support one or more selection devices (e.g., a cursor, selection window, etc.) to allow a user to select images, portions of images, and/or other information displayed via display 140 (e.g., subject information). Image display logic 260 may further operate with communication interface 240, user interface 230, and/or upload/download logic 270 to allow a user to communicate with a subject that appears in an image on display 140 and/or an individual associated with a subject appearing in display 140 (e.g., an owner of a building that appears in the image, where the building has a telephone number, email address, etc., associated therewith).

Upload/download logic 270 may include software or hardware to send an image and/or information related to an image to a destination and/or to receive an image and/or image related information. For example, upload/download logic 270 may operate with communication interface 240 to send an image (e.g., data and subject information) to a destination device (e.g., a server). Upload/download logic 270 may receive an image and/or information related to an image from another device, such as a PDA operated by a subject whose likeness appears in an image stored in terminal 100. For example, upload/download logic 270 may receive and/or send image and/or subject information from/to another device via email, IEEE 802.x (e.g., Bluetooth), Infrared Data Association (IrDA), Multimedia Messaging Service (MMS), etc. Upload/download logic 270 may operate with processing logic 210, storage 220, communication interface 240, and/or display logic 260 when uploading/downloading an image and/or other information to/from another device. Upload/download logic 270 and/or communication interface 240 may use communication identifiers (e.g., a name, a phone number, email address, IM address, IP address, etc.) to establish contact with a destination when sending and/or receiving information, such as images and/or subject information.

As will be described in detail below, terminal 100 may perform certain operations relating to associating subject information and/or annotations with an image (e.g., a digital photograph) captured via terminal 100. Terminal 100 may perform these operations in response to processing logic 210 executing software instructions of an image-based communication application contained in a computer-readable medium, such as storage 220. A computer-readable medium may be defined as a physical or logical memory device and/or carrier wave.

The software instructions may be read into storage 220 from another computer-readable medium or from another device via communication interface 240. The software instructions contained in storage 220 may cause processing logic 210 to perform processes that will be described later. Alternatively, hardwired circuitry may be used in place of or in combination with software instructions to implement processes consistent with principles of the invention. Thus, implementations consistent with principles of the invention are not limited to any specific combination of hardware circuitry and software.

Exemplary Data Structure

Figure 3A:
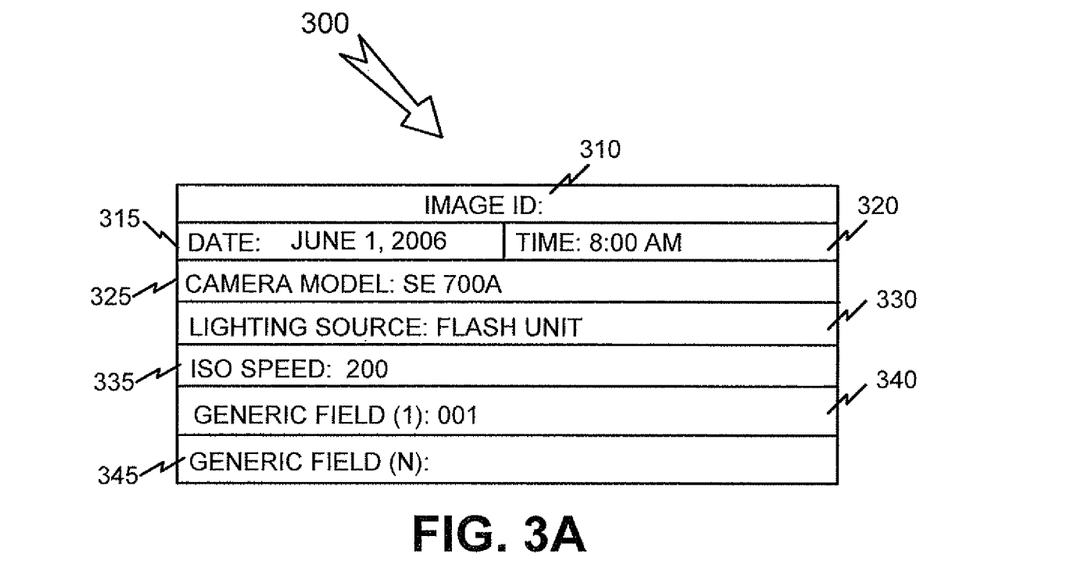
FIGS. 3A and 3B illustrate exemplary data structures.
Figure 3B:
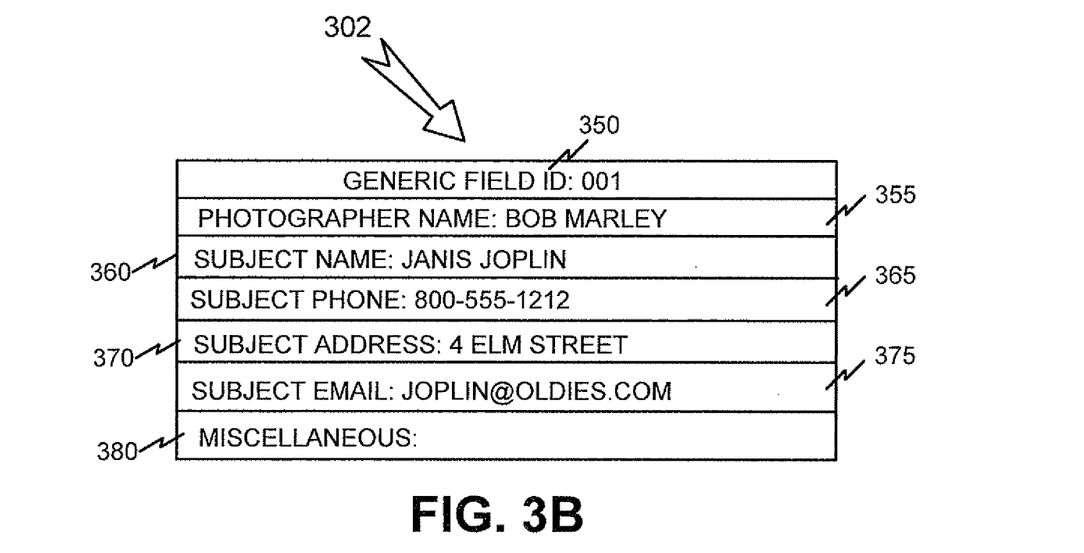

FIGS. 3A and 3B illustrate exemplary data structures 300 and 302, respectively. Data structures 300/302 may be implemented via computer-readable media that store information in a machine-readable format. Information in data structures 300/302 may be arranged in a row and column format to facilitate interpretation of information in data structures 300/302 by a user of terminal 100 and/or processing logic 210.

Data structures 300/302 may represent a portion of a header, start frame, start sequence, start marker, start tag, etc., for data representing an image, such as data included in an image. For example, data structures 300/302 may represent header fields for image file formats, such as Joint Picture Expert's Group (JPEG), Exchangeable Image File Format (Exif), Tagged Image File Format (TIFF), Graphic Interchange Format (GIF), Portable Network Graphics (PNG), bitmap, JPEG File Interchange Format (JFIF), etc. In other implementations, data structures 300/302 may represent other portions of a file that contains image data.

Referring now to FIG. 3A, data structure 300 may include image identifier (ID) 310, date 315, time 320, camera model 325, lighting source 330, International Organization for Standards (ISO) speed 335, generic field (1) 340 and generic field (N) 345. Image ID 310 may include information that identifies an image in terminal 100. Image ID 310 may include a number (e.g., 01, 02, etc.), a name (image 01, first day of new job, my dog, etc.), a link (e.g., a link to a file that includes a name for the image), etc. Date 315 may include information that identifies a date related to an image identified by image ID 310. Date 315 may identify a date when the image was captured, modified, stored, transmitted to a destination, etc. Time 320 may include information that identifies a time at which an image identified by image ID 310 was captured, modified, stored, transmitted to a destination, etc.

Camera model 325 may include information that identifies a camera related to an image identified by image ID 310. Camera model 325 may include a manufacturer's name and/or model number. Lighting source 330 may include information that identifies an assumed illumination source related to an image identified by image ID 310. For example, lighting source 330 may include "flash unit" to indicate that flash 160 was the assumed lighting source used when an image was captured with terminal 100 and/or "natural" to indicate that ambient lighting was the assumed lighting source used when an image was captured using terminal 100. ISO speed 335 may include information that identifies an ISO number related to an image identified via image ID 310.

Generic field (1) 340 and generic field (N) 345 may include miscellaneous information related to a header portion for an image, such as a JPEG image. Generic fields may be fields that are available for use. As described herein, an application that relates subject information to an image to facilitate image-based dialing using terminal 100 may store certain information in generic field (1) 340 and/or generic field (N) 345. Information in generic field (1) 340 and/or generic field (N) 345 may include addresses, links, and/or content, such as data. In one implementation, generic field (1) 340 may include a value that identifies another data structure, such as data structure 302, that can include information related to an image identified by image ID 310.

Referring now to FIG. 3B, data structure 302 may include generic field ID 350, photographer name 355, subject name 360, subject phone 365, subject address 370, subject email 375 and miscellaneous 380. Generic field ID 350 may include information that identifies a value related to generic field (1) 340 and/or generic field (N) 345. Information in generic field ID 350 may serve to relate data structure 302 to data structure 300.

Photographer name 355 may include information that identifies an operator of terminal 100 when an image was captured via camera 250. In an implementation, photographer name 355 may be populated automatically with information obtained from an owner identifier stored in terminal 100, such as the name of an owner of terminal 100. In another implementation, a user may enter the photographer name via keypad 110, control keys 120, a voice prompt, and/or a touch-sensitive display. In still another implementation, photographer name 355 may be obtained from a remote device, such as a remote device that sent the image to terminal 100.

Subject name 360 may include information that identifies a subject in an image related to terminal 100 and/or that identifies a person that captured an image (e.g., the name of a photographer or user of terminal 100). Subject phone 365 may include information that identifies a phone number related to a subject identified by subject name 360. Subject address 370 may include information that identifies an address related to a subject identified by subject name 360. Subject email 375 may include information that identifies an email address related to a subject identified by subject name 360. Miscellaneous 380 may include information related to a subject identified via subject name 360 and/or other fields in data structure 302 and/or 300. For example, miscellaneous 380 may include notes about an image captured by a user of terminal 100 and/or a link to audio information related to an image and/or a subject.

Other implementations of data structures 300/302 may include additional fields or fewer fields. Moreover, implementations of terminal 100 may include substantially any number of data structures 300/302, such as a first data structure related to a first image and a second data structure related to a second image. Data structures 300/302 may be implemented in many forms. For example, in one implementation, information in data structures 300/302 may be stored as meta data that is related to the content of an image.

Exemplary Image Labeling Technique

Implementations of terminal 100 may label an image with information that can be used to identify the image (e.g., an image name), a subject (person) in the image and/or related to an image (e.g., via a person's name), a location related to the image (e.g., a location where the image was captured), a size of the image, a format of the image, a status of the image, etc. Images may be labeled using a variety of techniques. For example, labels can include information entered by a user of terminal 100 and/or information received from a device, such as a device carried by a subject that is photographed.

Figure 4A:
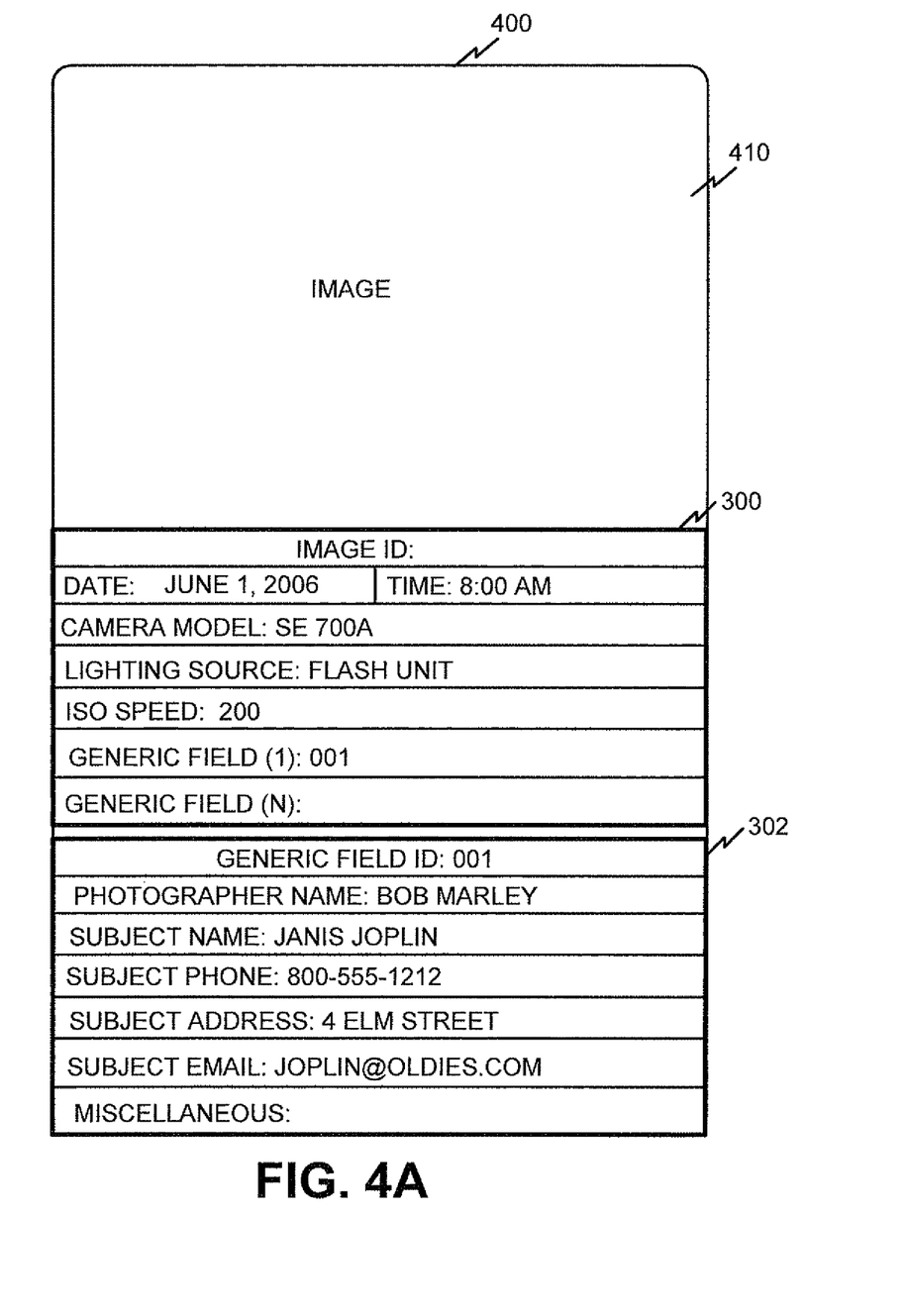
FIG. 4A illustrates an exemplary technique for relating information to a displayed image.

FIG. 4A illustrates an exemplary technique 400 for relating an image to information. In FIG. 4A, image data 410 (hereinafter image 410) may be labeled via data structures 300 and/or 302 or via portions of data structures 300 and/or 302. Data structures 300 and/or 302 may be written into a portion of image 410, such as a lower portion, as shown in FIG. 4A. Data structures 300/302 and image 410 may be stored in terminal 100, received from another device via terminal 100, and/or transmitted to a destination using terminal 100.

Figure 4B:
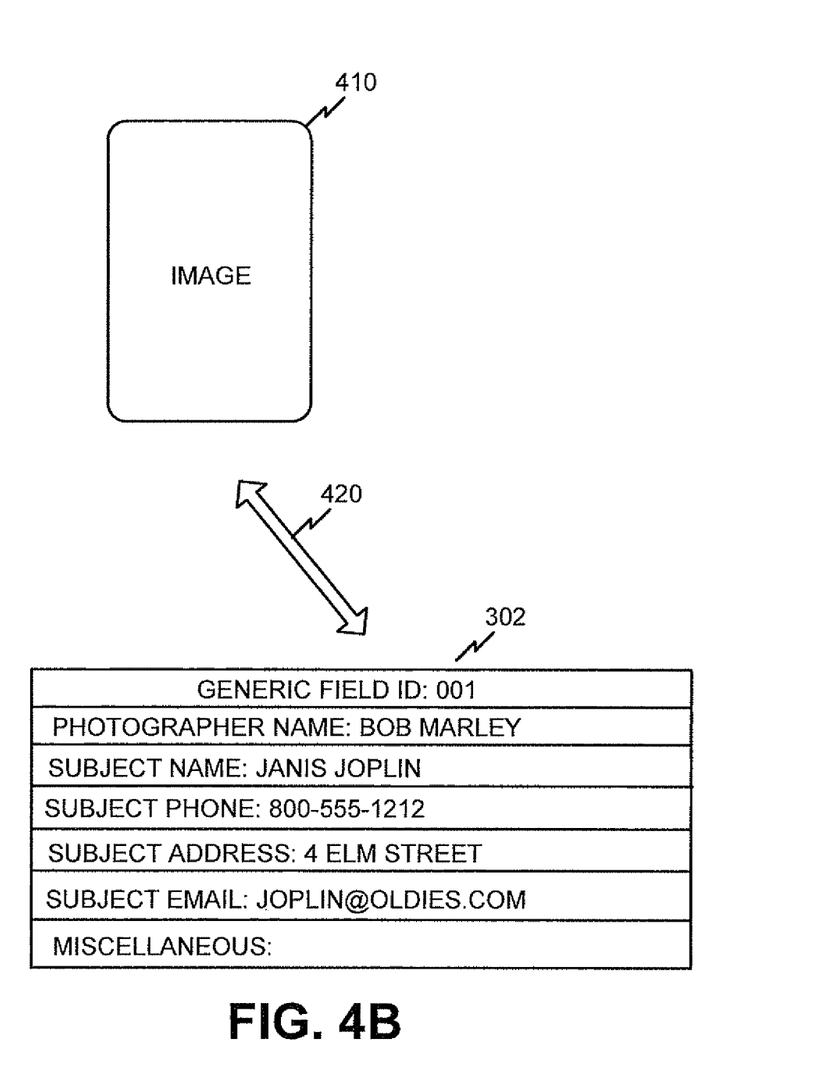
FIG. 4B illustrates an exemplary technique for linking information to an image that can be displayed via a mobile terminal.

FIG. 4B illustrates an exemplary technique for linking information to an image. In the implementation of FIG. 4B, image 410 and data structure 302 may be stored separately, such as in different memory locations of storage 220, and may be linked to each other via link 420. Link 420 may include a device or technique for referencing one object with another object. In one implementation, link 420 may be a pointer. For example, a first image may have a first data structure containing subject information for the first image, where the first data structure is stored with the first image in a configuration similar to that of FIG. 4A. A second image may include the same subject that appears in the first image. The second image may be linked to the first data structure via link 420 so that the first data structure and/or information contained therein does not have to be stored twice.

Exemplary Processing

Figure 5:
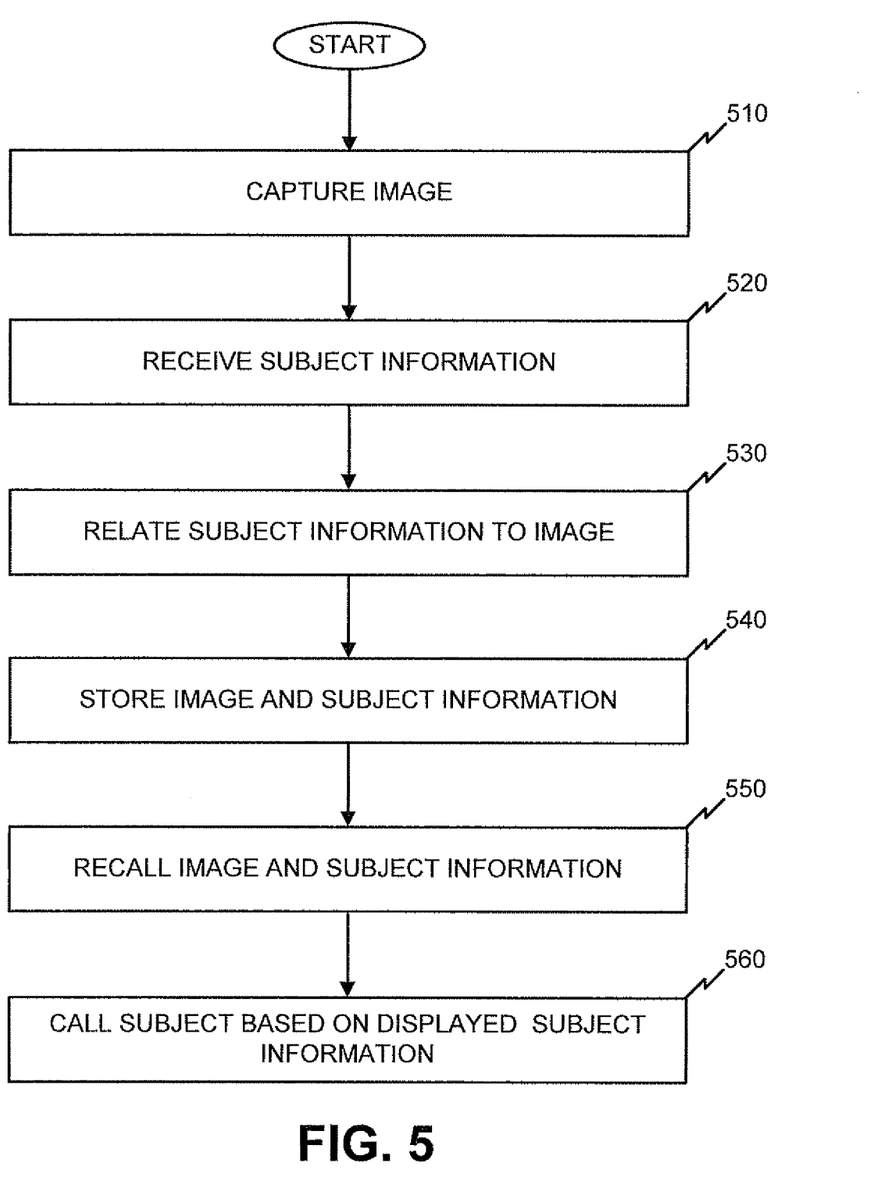
FIG. 5 illustrates exemplary processing that can be used to perform image-based dialing.

FIG. 5 illustrates exemplary processing that can be used to perform image-based dialing. A user may capture a digital image via terminal 100 (block 510). Assume that a user is a tourist in an unfamiliar city. For example, a Swedish citizen may be vacationing in New York City. The tourist may be taking in the sights of Manhattan and may be capturing images via a cellular telephone equipped with a digital camera (e.g., terminal 100). The tourist may not remember the names of subjects that were photographed and/or the names of locations where images were captured with terminal 100 since the tourist is in unfamiliar surroundings. For example, the tourist may have met a person that resides in New York City (the resident). The resident may have shown the tourist around Manhattan. The tourist may have photographed the resident in front of one or more landmarks. When the tourist arrives back home in Sweden, he may not remember the name of the resident since the tourist may have met other people while on vacation. Implementations of terminal 100 may help the tourist identify people photographed using terminal 100 and/or using other devices.

Terminal 100 may be adapted to receive subject information (block 520). Terminal 100 may receive subject information related to the user (tourist), such as the user's name, address, phone number and email address. Terminal 100 may further receive subject information related to a person other than the user, such as a person appearing in an image captured by the user using terminal 100 and/or information about a person that is associated with another image, such as a photographer that may send an image to terminal 100. For example, a user may enter information related to data structure 302 into terminal 100, where the information in data structure 302 is related to a subject in one or more images (photographs) captured by the user using terminal 100. Assume that the tourist enters the resident's name (Janis Joplin, FIG. 3B), phone number (800-555-1212), residential address (4 Elm Street), and/or email address (Joplin@oldies.com) into terminal 100.

Terminal 100 may relate the subject information with an image (block 530). For example, terminal 100 may attach data structure 302 to an image, such as image 410 (FIG. 4A) and/or may relate data structure 302 with image 410 via link 420 (FIG. 4B). Terminal 100 may use tags and/or fields related to a file containing image 410 to relate subject information to image 410. Terminal 100 may map subject information to images in a format that is compatible with image display logic 260 so that image 410 and subject information in data structure 302 can be displayed together via display 140. Terminal 100 and/or a user may be able to access information in data structure 302 via image 410 once image 410 and data structure 302 are related via terminal 100.

Assume that the tourist captures an image of the resident in front of St. Patrick's Cathedral (the cathedral). The tourist may display the image of the resident and cathedral on display 140. The tourist may relate the resident's information contained in data structure 302 (e.g., name, phone number, residential address, and/or email address) with the displayed image.

In an implementation, the tourist may be able to link the resident's face, or other features, to the information in data structure 302. For example, the tourist may place a cursor over the face of Janis Joplin in image 410 and may depress a button/key, such as control key 120 and/or one of keys 112, to relate information in data structure 302 to the face of Janis Joplin.

Terminal 100 may retrieve the subject information from a header of the image when displaying subject information via display 140. In another implementation, terminal 100 may automatically relate subject information to an image. For example, terminal 100 may capture an image and may retrieve subject information from another application (e.g., a database), the subject (e.g., via a wireless link), and/or from another image (e.g., from a header portion of another image stored in terminal 100) and may relate the subject information to the captured image without a user input. Terminal 100 may display the subject information on display 140 along with the image.

Terminal 100 may store an image and/or a data structure (block 540). For example, terminal 100 may store image 410 and data structure 302 in a single memory location in storage 220 or may store image 410 in a first memory location and data structure 302 in a second location in storage 220. Terminal 100 may store data structure 302 in a portion of a header for image 410. Data structure 302 may be small in size as compared to image 410; therefore, storing data structure 302 with image 410 may have a substantially negligible effect on storage space as compared to storing only image 410.

Assume that the tourist speaks the command "store image" into microphone 150 while image 410 (cathedral and Janis Joplin) is displayed. Terminal 100 may store the cathedral/resident image and the resident's information (e.g., data structure 302) in storage 220. Terminal 100 may store the cathedral/resident image and data structure 302 together and/or separately. Terminal 100 may further store associations, such as links, between portions of images 410 and data structure 302, such as a link from Janis Joplin's face in image 410 to her name in data structure 302.

In another implementation, terminal 100 may store image 410 automatically, i.e., without requiring instructions from the user. For example, terminal 100 may capture an image, may relate subject information to the image and may store the image and subject information automatically.

At some later point, the user may recall image 410 and subject information from storage 220 (block 550). For example, the tourist may have returned home to Sweden and may be showing vacation pictures to friends. The tourist may recall the cathedral image that includes the resident (Janis Joplin). The resident's information in data structure 302 may be displayed on display 140 with the cathedral image (e.g., Janis Joplin, 800-555-1212, 4 Elm St., and/or Joplin@olidies.com). For example, terminal 100 may retrieve the subject information from a header of image 410 and may display the retrieved subject information on display 140 with the cathedral/resident image. The tourist may remember the resident's name when he/she sees the name displayed proximate to a likeness of the resident on display 140. In an implementation, the tourist may select a resident displayed in an image and that resident's information may be highlighted and/or may blink in display 140.

Terminal 100 may be configured to allow the tourist to scroll through an image catalog that can include substantially any number of images having subject information related thereto. Terminal 100 may retrieve subject information from a header for a respective image and may display subject information for the image when the image is displayed on display 140.

The user may call a subject displayed in an image (block 560). For example, the tourist may press control key 120, keys 112, speak a prompt, etc., to call the resident displayed in image 410. Assume the tourist speaks "call" into microphone 150 to cause terminal 100 to dial 800-555-1212 to reach Janis Joplin while a picture of Janis Joplin and/or the name "Janis Joplin" appears on display 140 along with the cathedral image. Alternatively, the tourist may speak "email" to cause terminal 100 to open an email composition window on display 140 and/or to send a pre-composed email to Joplin@oldies.com. Other implementations may allow the tourist to select one or more subjects displayed in an image and may let the tourist call selected subjects at the same time to form a multi-party call, such as a conference call.

Implementations may allow a user to configure terminal 100 to automatically label captured images with subject information about a user of terminal 100. Terminal 100 may further send the user's information to a destination along with the captured image. A receiving device (destination device) may see the user's information when the received image is displayed on the destination device. An operator of the destination device may call the user by performing an action, such as depressing a control key while the received image and user's information is displayed on the destination device.

In another implementation, a user may be able to record a sound and attach it to an image along with attaching information in data structure 302 to the image. For example, the tourist may have recorded a hymn played by the bell tower of St. Patrick's Cathedral via microphone 150 on terminal 100. The tourist may have attached the digitized hymn and/or other information (e.g., information entered via keypad 110) to the image containing the cathedral/resident and/or to data structure 302 that contains information about the resident (Janis Joplin). The tourist may have stored the hymn, image and subject information in storage 220. The tourist may recall the cathedral image, digitized hymn and information in data structure 302 and/or may send the cathedral image, digitized hymn and information in data structure 302 to a destination via a wireless and/or hardwired link.

In still another implementation, terminal 100 may be configured to retrieve one or more names from a database and relate one of the retrieved names to a displayed image based on a user action. Assume a user receives an image from a source device and the image includes a picture of a person named Billy Joel. Further assume that the picture has a label "Bill" related thereto when the image is received at terminal 100. Terminal 100 may retrieve names having Bill therein so the user can select the name of the appropriate person displayed in the received image. For example, terminal 100 may display Bill Jones, Thomas Bill White, Mr. Bill and Billy Joel. The user may select Billy Joel and terminal 100 may store Billy Joel and Billy Joel's contact information in a header portion of the image that was identified as Bill. Terminal 100 may retrieve names from a local database on terminal 100 (e.g., a phonebook in terminal 100) and/or a remote database (e.g., a telephone directory for an organization that resides on a server). Information retrieved from the database may be retrieved from image file headers, text files, and/or other portions of files and/or formats.

Conclusion

Implementations described herein may facilitate relating information, such as subject information, to images that are captured using a mobile terminal. Implementations may further facilitate dialing a phone number related to a subject displayed in an image using terminal 100.

The foregoing description of preferred embodiments of the invention provides illustration and description, but is not intended to be exhaustive or to limit the invention to the precise form disclosed. Modifications and variations are possible in light of the above teachings or may be acquired from practice of the invention.

While a series of acts has been described with regard to FIG. 5, the order of the acts may be modified in other implementations consistent with the principles of the invention. Further, non-dependent acts may be performed in parallel.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

Further, certain portions of the invention may be implemented as "logic" that performs one or more functions. This logic may include hardware, such as hardwired logic, an application specific integrated circuit a field programmable gate array, a microprocessor, software, or a combination of hardware and software.

It should be emphasized that the term "comprises/comprising" when used in this specification and/or claims is taken to specify the presence of stated features, integers, steps or components but does not preclude the presence or addition of one or more other features, integers, steps, components or groups thereof.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A device, comprising:
   storage storing contact information for each of a plurality of people;
   an image display component configured to:
      display an image, wherein the image is related to an image file that includes a header portion, where the image comprises at least one subject, the at least one subject having a facial image;
   a transceiver; and
   a processor configured to:
      receive a first input from a user, that selects one of the subjects in the image,
      receive a second input from a user comprising contact information for the selected subject, wherein the contact information is (i) entered by the user, or (ii) selected, by the user, from the stored contact information,
      and
      receive a third input from a user that associates the entered or selected contact information with a portion of the image that includes the facial image of the subject from the first input, wherein the association stores the contact information from the second input as subject information in the header portion of the image file, and
   wherein the processor is further configured to:
      subsequent to receiving the third input, provide the image to the image display component,
      receive a fourth input from a user that selects the portion of the image that includes the facial image of the subject,
      in response to receiving the fourth input, display the subject information, concurrently with the display of the image,
      in response to the concurrent display, receive a fifth input from a user that requests to contact the subject, and
      retrieve the contact information from the header portion, and send the contact information to the transceiver to cause the transceiver to contact the subject using the contact information.

2. The device of claim 1, further comprising:
   a camera configured to capture the image in response to a user input.

3. The device of claim 1, wherein the contact information comprises at least one of a name, a telephone number, an email address, an instant messaging address, an Internet protocol address, or a residential address.

4. The device of claim 1, wherein the header portion comprises a header, a start frame, a start segment, a marker, or a tag.

5. The device of claim 1, wherein the transceiver is further configured to, based on the contact information, contact the subject by dialing at least one of a phone number, sending an email to an email address, or sending an instant message to an instant messaging address.

6. The device of claim 1, wherein the processor is further configured to receive the fifth input that requests to contact the subject in response to at least one of a voice prompt, a control key signal, a keypad signal, or a touch-sensitive display signal.

7. The device of claim 1, wherein the device receives the subject information from one of the device or another device.

8. The device of claim 1, wherein the transceiver is further configured to send the image and the subject information to a destination automatically or based on a request from a remote device.

9. A method, comprising:
- storing, using a computing device processor of a device, contact information for each of a plurality of people;
- displaying, using an image display component of the device, an image, wherein the image is related to an image file that includes a header portion, where the image comprises at least one subject, the at least one subject having a facial image;
- receiving, by a computing device processor, a first input from a user that selects one of the subjects in the image;
- receiving, by a computing device processor, a second input from a user comprising contacting information for the selected subject, wherein the contact information is (i) entered by the user, or (ii) selected, by the user, from the stored contact information;
- receiving, by a computing device processor a third input from a user that associates
- the entered or selected contact information with a portion of the image that includes the facial image of the subject from the first input, wherein the association stores the contact information from the second input as subject information in the header portion of the image file;
- subsequent to receiving the third input, providing, by a computing device processor, the image to the image display component;
- receiving, by a computing device processor, a fourth input from a user that selects the portion of the image that includes the facial image of the subject;
- in response to receiving the fourth input, displaying, b a computing the subject information concurrently with the display of the image;
- in response to the concurrent display, receiving, by a computing device processor, a fifth input from a user that requests to contact the subject;
- in response to receiving the fifth input, retrieving, by a computing device processor, the contact information from the header portion; and
- sending the contact information to a transceiver in the device to cause the transceiver to contact the subject using the contact information.

10. The method of claim 9, further comprising, capturing, using a camera of the device, the image in response to a user input.

11. The method of claim 9, wherein the contact information comprises at least one of a name, a telephone number, an email address, an instant messaging address, an Internet protocol address, or a residential address.

12. The method of claim 9, wherein the header portion comprises a header, a start frame, a start segment, a marker, or a tag.

13. The method of claim 9, further comprising contacting, based on the contact information, the subject by dialing at least one of a phone number, sending an email to an email address, or sending an instant message to an instant messaging address.

14. The method of claim 9, further comprising receiving the fifth input that requests to contact the subject in response to at least one of a voice prompt, a control key signal, a keypad signal, or a touch-sensitive display signal.

* * * * *

UNITED STATES PATENT AND TRADEMARK OFFICE
CERTIFICATE OF CORRECTION

| | | |
|---|---|---|
| PATENT NO. | : 9,241,056 B2 | Page 1 of 1 |
| APPLICATION NO. | : 11/425744 | |
| DATED | : January 19, 2016 | |
| INVENTOR(S) | : Fredrik Alexander Lönn | |

It is certified that error appears in the above-identified patent and that said Letters Patent is hereby corrected as shown below:

IN THE CLAIMS

Column 16, Lines 9-10, replace "b a computing" with "by a computing device processor,".

Signed and Sealed this
Nineteenth Day of April, 2016

Michelle K. Lee
*Director of the United States Patent and Trademark Office*